(12) United States Patent
Nishimoto et al.

(10) Patent No.: US 9,116,374 B2
(45) Date of Patent: Aug. 25, 2015

(54) ELECTRO-OPTICAL DEVICE

(71) Applicant: Japan Display Inc., Tokyo (JP)

(72) Inventors: Takuya Nishimoto, Tottori (JP); Yuichi Tsubaki, Tottori (JP)

(73) Assignee: Japan Display Inc., Tokyo (JP)

( * ) Notice: Subject to any disclaimer, the term of this patent is extended or adjusted under 35 U.S.C. 154(b) by 167 days.

(21) Appl. No.: 13/737,442

(22) Filed: Jan. 9, 2013

(65) Prior Publication Data
US 2013/0194512 A1    Aug. 1, 2013

(30) Foreign Application Priority Data

Jan. 27, 2012  (JP) ................................ 2012-015350

(51) Int. Cl.
   *G02F 1/1333*         (2006.01)
(52) U.S. Cl.
   CPC  *G02F 1/133308* (2013.01); *G02F 2001/13332* (2013.01); *G02F 2001/133314* (2013.01); *G02F 2001/133317* (2013.01); *G02F 2201/54* (2013.01)
(58) Field of Classification Search
   CPC .............. G02F 1/133308; G02F 2001/13332; G02F 2001/133317; G02F 2201/46; G02F 2001/133314; G02F 2201/54
   USPC ......................................................... 349/58
   See application file for complete search history.

(56) References Cited

U.S. PATENT DOCUMENTS

| | | | | |
|---|---|---|---|---|
| 6,166,788 | A * | 12/2000 | Ha et al. ............................ | 349/58 |
| 6,909,475 | B2 * | 6/2005 | Kojima et al. ..................... | 349/58 |
| 2009/0079901 | A1 * | 3/2009 | Yada et al. ........................ | 349/58 |
| 2009/0180244 | A1 * | 7/2009 | Kiyohara .................. | 361/679.01 |
| 2011/0013112 | A1 * | 1/2011 | Yaguchi et al. ................... | 349/58 |
| 2011/0051033 | A1 * | 3/2011 | Shimizu ........................... | 349/58 |
| 2012/0162546 | A1 * | 6/2012 | Shimomichi ................ | 348/794 |

FOREIGN PATENT DOCUMENTS

| | | |
|---|---|---|
| JP | 2002-320010 | 10/2002 |
| JP | 2004-021104 | 1/2004 |
| JP | 2011-018624 | 1/2011 |
| JP | 2011-047974 | 3/2011 |

OTHER PUBLICATIONS

European Search Report issued May 14, 2013 for corresponding European Appln. No. 12195536.3.
Japanese Office Action issued Mar. 3, 2015 in corresponding Japanese Application No. 2012-015350.

* cited by examiner

*Primary Examiner* — Michael Caley
*Assistant Examiner* — Jia Pan
(74) *Attorney, Agent, or Firm* — K&L Gates LLP

(57) ABSTRACT

An electro-optical device includes: an electro-optical panel; and a casing supporting and protecting the electro-optical panel, wherein the casing has a first frame body made by die casting supporting the electro-optical panel through a fixing layer, a second frame body protecting a lower surface of the electro-optical panel, a third frame body protecting end edges of the electro-optical panel, and a fixing portion fixing the second frame body and the third frame body to each other by a clamping force working in a first direction, and the fixing portion or the second frame body has an interference portion preventing falling-off of the first frame body in a state where a force is not applied to the first frame body in the first direction.

8 Claims, 8 Drawing Sheets

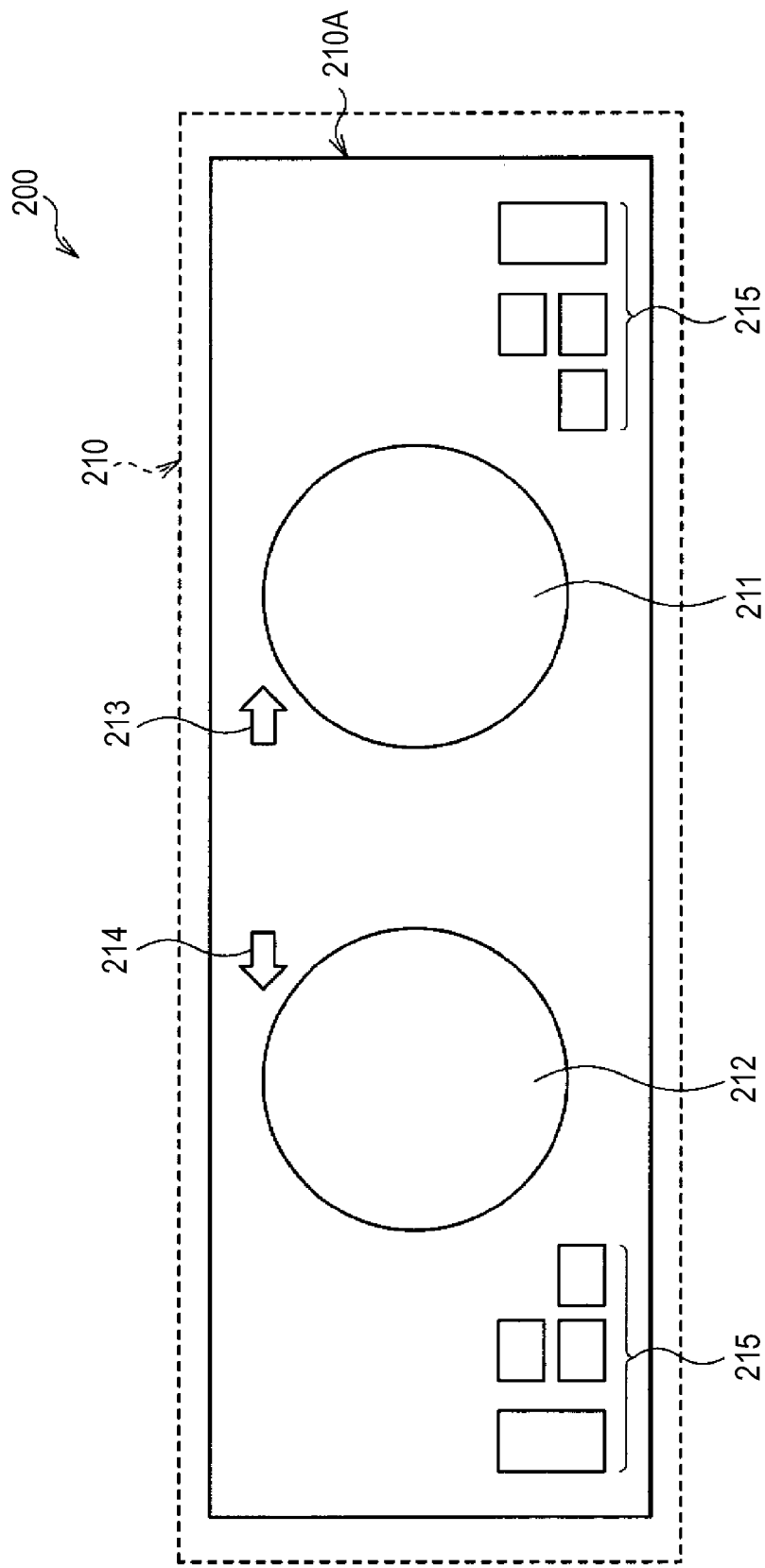

ELECTRO-OPTICAL DEVICE

CROSS REFERENCES TO RELATED APPLICATIONS

The present application claims priority to Japanese Priority Patent Application JP 2012-015350 filed in the Japan Patent Office on Jan. 27, 2012, the entire content of which is hereby incorporated by reference.

BACKGROUND

The present disclosure relates to an electro-optical device having an electro-optical panel such as a liquid crystal panel.

In recent years, the electro-optical panel such as a liquid crystal panel is used in various places in a car. For example, the electro-optical panel is used for a display unit in a car navigation device. Recently, the electro-optical panel is also used for an instrument panel, which displays the speed of the car, the number of engine revolutions, the fuel level, the temperature of engine cooling water and so on.

The electronic-optical panel is covered by a casing together with a drive substrate for protecting the panel from the shock and so on from the outside (for example, refer to JP-A-2011-186024 (Patent Document 1)). When a liquid crystal panel is used as the electric-optical panel and a backlight irradiating light on the liquid crystal panel as a light source is further used, the casing includes, for example, a lower metal frame supporting the backlight and the drive substrate, a middle metal frame supporting the electro-optical panel and an upper metal frame protecting the electro-optical panel by being combined with these frames. An opening is provided in the upper metal frame so as to correspond to a display surface of the electro-optical panel, and positioning between the display surface of the electro-optical panel and the opening in the upper metal frame is performed by fixing respective frames to one another by using bolts and so on.

SUMMARY

When respective metal frames are fixed to one another by using bolts and so on as described above, the stress generated by clamping by bolts may be transmitted to the electro-optical panel. In the case where the flatness of a supporting surface of the middle metal frame supporting the electro-optical panel is low, not only the above-described stress but also the stress due to the lowness of the flatness may be transmitted to the electro-optical panel. As the electro-optical panel becomes high in definition as well as in a viewing angle, luminance unevenness caused by the stress appears more conspicuously.

In view of the above, it is desirable to provide an electro-optical device capable of reducing luminance unevenness caused by the stress added on the electro-optical panel.

An embodiment of the present disclosure is directed to an electro-optical device including an electro-optical panel, and a casing supporting and protecting the electro-optical panel. The casing has three frame body (a first frame body, a second frame body, and a third frame body) and a fixing portion. The first frame body is made by die casting and supports the electro-optical panel through a fixing layer. The second frame body protects a lower surface of the electro-optical panel. The third frame body protects end edges of the electro-optical panel. The fixing portion fixes the second frame body and the third frame body to each other by a clamping force working in a first direction. In the electro-optical device according to the embodiment of the present disclosure, the fixing portion or the second frame body has an interference portion preventing falling-off of the first frame body in a state where a force is not applied to the first frame body in the first direction.

In the electro-optical device according to the embodiment of the present disclosure, the second frame body protecting the lower surface of the electro-optical panel and the third frame body protecting end edges of the electro-optical panel are fixed to each other by the clamping force working in the first direction by the fixing portion. Moreover, the fixing portion or the second frame body prevents falling-off of the first frame body supporting the electro-optical panel in the state where the force is not applied to the first frame body in the first direction. Accordingly, distortion caused by the clamping by the fixing portion can hardly propagate to the first frame body. Also in the electro-optical device according to the embodiment of the present disclosure, the first frame body is made by die casting. Accordingly, as the first frame body has characteristics of high stiffness and low distortion, distortion can hardly occur in the first frame body, and further, distortion of other members can hardly propagate to the electro-optical panel through the first frame body.

In the electro-optical device according to the embodiment of the present disclosure, distortion can hardly propagate to the first frame body supporting the electro-optical panel, and further, distortion can hardly occur in the first frame body and distortion of other members can hardly propagate to the electro-optical panel through the first frame body, luminance unevenness caused by the stress added to the electro-optical panel can be reduced.

Additional features and advantages are described herein, and will be apparent from the following Detailed Description and the figures.

BRIEF DESCRIPTION OF THE FIGURES

FIG. 10 is a front view of an instrument panel according to another application example.

DETAILED DESCRIPTION

Hereinafter, modes for carrying out the present disclosure will be explained in detail with reference to the drawings. The explanation will be made in the following order.

1. Embodiment
2. Modification Examples
3. Application examples

1. EMBODIMENT

Configuration

Figure 1:
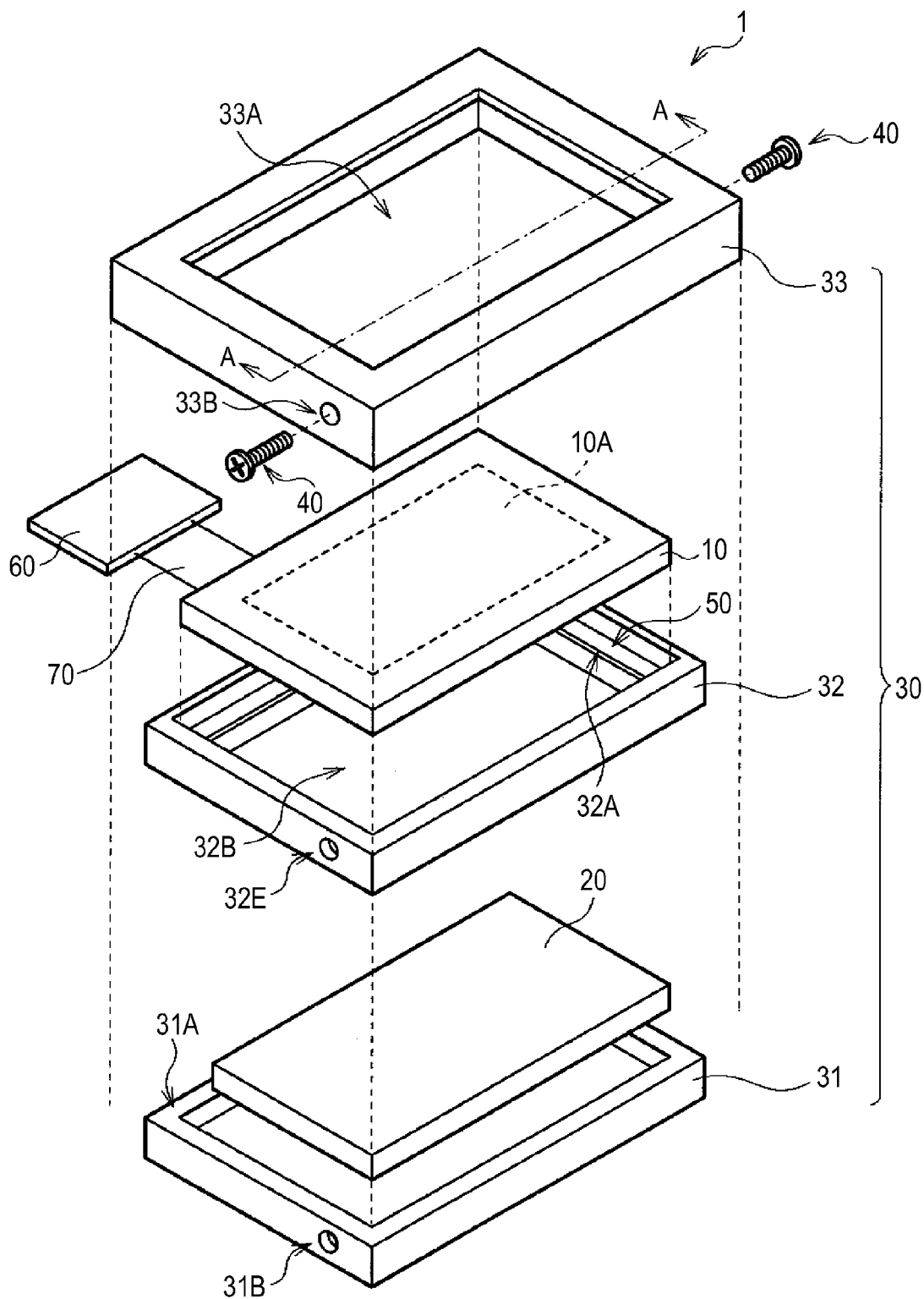
FIG. 1 is a developed perspective view of a display device according to an embodiment of the present disclosure.
Figure 2:
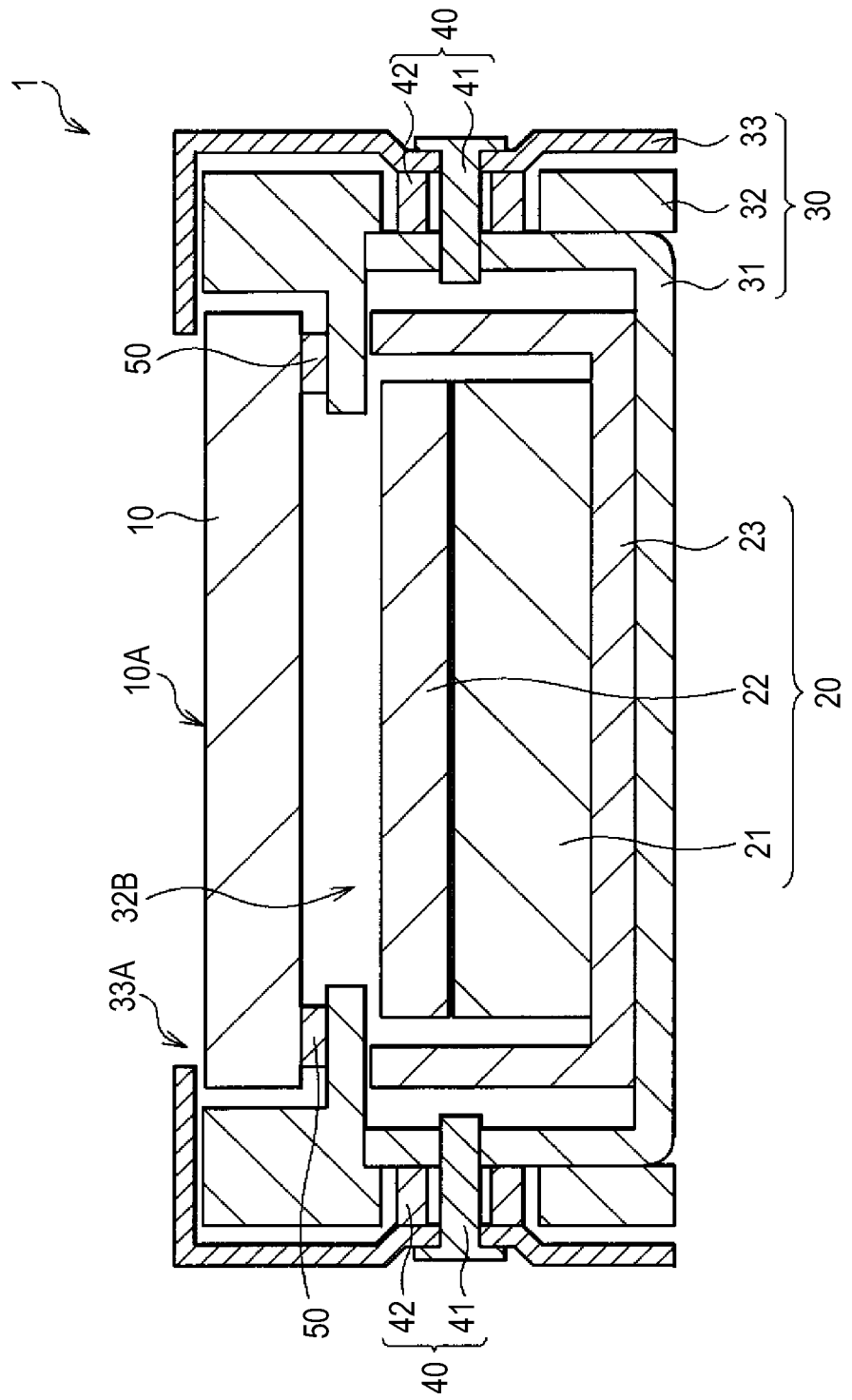
FIG. 2 is a cross-sectional view of the display device of FIG. 1.

A display device 1 according to an embodiment of the present disclosure will be explained. FIG. 1 perspectively shows an example of an outline structure of the display device 1 in a developed view. FIG. 2 shows an example of a cross-sectional structure taken along A-A line of the display device 1 of FIG. 1. The display device 1 includes a display panel 10, a backlight 20 disposed in the back of the display panel 10 and a frame body 30 supporting as well as protecting the display panel 10 and the backlight 20. The display panel 10 corresponds to a specific example of an "electro-optical panel" of the technology according to the present disclosure, and a structure including the frame body 30 and a later-described fixing portion 40 corresponds to a specific example of a "casing" of the technology according to the present disclosure.

The display device 1 further includes the fixing portion 40, a fixing layer 50, a drive substrate 60 and a flexible printed circuit (FPC) 70. The drive substrate 60 displays a video on the display panel 10 by driving the display panel 10, which is arranged, for example, on a back side of the backlight 20. The FPC 70 electrically connects the display panel 10 to the drive substrate 60, which is connected to the display panel 10 and the drive substrate 60 with a gap with respect to an inner surface of the frame body 30 and a gap with respect to a side surface of the backlight 20. The fixing portion 40 and the fixing layer 50 will be described later.

(Display Panel 10)

The display panel 10 is for displaying a video, which is formed to have, for example, a rectangular shape with four edges as shown in FIG. 1. The display panel 10 displays a video by modulating incident light, which is, for example, a transmissive display panel modulating light incident from the back side and outputting image light from an upper surface by driving respective pixels in accordance with a video signal. The display panel 10 is configured by a pair of transparent substrates sandwiching a liquid crystal layer. An area in which respective pixels are arranged in an upper surface of the display panel 10 is a video display surface 10A and an area corresponding to an outer edge in the upper surface of the display panel 10 (specifically, a circumferential edge of the video display surface 10A) is a frame area as a no-video display area.

(Backlight 20)

The backlight 20 irradiates light on the back of the display panel 10, which is formed to have, for example, a rectangular shape with four edges as shown in FIG. 1. The backlight 20 includes, for example, a light source 21 and various optical sheets 22 arranged on an upper surface of the light source 21. The light source 21 is, for example, an edge-light type light source, including, for example, an optical waveguide and a linear light source arranged at an end portion of the optical waveguide. The light source 21 may be, for example, a direct-type light source in which plural linear light sources are arranged in a plane. The backlight 20 further includes a pedestal 23 supporting and protecting the light source 21 and the optical sheets 22. The pedestal 23 has an opening so as to correspond to the video display surface 10A of the display panel 10. The pedestal 23 is fixed to the frame body 30 by, for example, screws and so on, thereby performing positioning between the video display surface 10A and the opening of the pedestal 23.

(Frame Body 30)

The frame body 30 has a box shape. When the display panel 10 and the backlight 20 has the rectangular shape having four edges as shown in FIG. 1, the frame body 30 has a rectangular parallelepiped shape. The frame body 30 has a middle frame 32 supporting the display panel 10 through the fixing layer 50, a lower frame 31 protecting a lower surface of the display 10 (also the backlight 20) and an upper frame 33 protecting end edges of the display panel 10. The middle frame 32 corresponds to a specific example of a "first frame body" of the technology according to the present disclosure, the lower frame 31 corresponds to a specific example of a "second frame body" of the technology according to the present disclosure and the upper frame 33 corresponds to a specific example of a "third frame body" of the technology according to the present disclosure.

The middle frame 32 is made by die casting, having characteristics of high stiffness and low distortion. The middle frame 32 is formed by including, for example, an aluminum alloy or a magnesium alloy. The lower frame 31 is preferably made by die casting, or may be configured by a sheet-metal processing member or a resin molding member. The upper frame 33 is made by die cast, or formed by the sheet-metal processing member or the resin molding member. When the lower frame 31 and the upper frame 33 are made by die casting, the lower frame 31 and the upper frame 33 are formed by including the aluminum alloy or the magnesium alloy.

Figure 3:
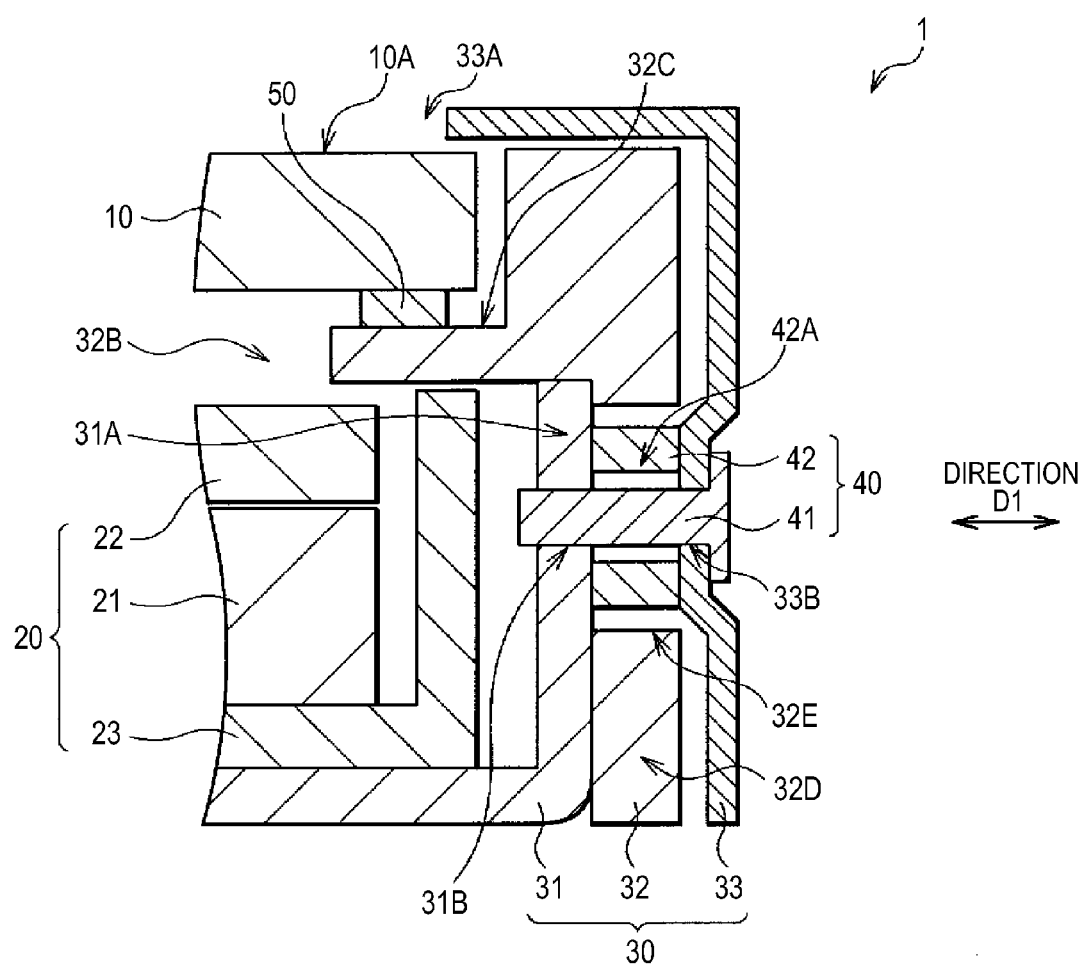
FIG. 3 is a cross-sectional view of a fixing portion and neighboring portions in the display device of FIG. 1.

The middle frame 32 includes a supporting portion 32A at a position facing the lower surface of the display panel 10. The supporting portion 32A has an opening 32B at a position facing the video display surface 10A, which is formed to have, for example a ring shape. As shown in FIG. 3, an upper surface of the supporting portion 32A is a supporting surface 32C touching the lower surface of the display panel 10 through the fixing layer 50. The supporting surface 32C is a planar surface which is, for example, a flat surface to which planarization processing is performed. The middle frame 32 further includes a wall plate 32D extending along the side surface of the backlight 20 at a position facing the side surface of the backlight 20. The wall plate 32D has one or plural openings 32E piercing in a direction parallel to the video display surface 10A (a direction D1 shown in FIG. 2 and FIG. 3). The fixing portion 40 is inserted through the opening 32E. The direction parallel to the video display surface 10A (direction D1) corresponds to a specific example of a "first direction" of the technology according to the present disclosure.

The lower frame 31 is a container for housing the backlight 20. The lower frame 31 is formed by including a bottom plate arranged at a position facing a lower surface of the backlight 20 and a wall plate facing the side surface of the backlight 20 as well as provided to stand on end edges of the bottom plate. The wall plate of the lower frame 31 is arranged between the side surface of the backlight 20 and the wall plate 32D of the middle plate 32, which touches at least the wall plate 32D (an inner peripheral surface of the wall plate 32D) of the middle frame 32. Moreover, in the wall plate of the lower frame 31, an upper surface of an end portion (an upper end portion 31A) close to the display panel 10 directly touches the middle frame 32. That is, the lower frame 31 supports the middle frame 32 at the upper end portion 31A. The upper surface of the upper end portion 31A touches a lower surface of the supporting portion 32A, or a surface which is a different portion from the supporting portion 32A of the middle frame 32 as well as parallel to the lower surface of the supporting portion 32A. The wall plate of the lower frame 31 has one or plural openings 31B piercing in the direction parallel to the video display surface 10A (direction D1). The opening 31B is provided at a position facing the opening 32E of the middle frame 32, having a smaller diameter than a diameter of the opening 32E. The diameter of the opening 31B is approximately the same as a diameter of a tip portion of a later-descried screw 41, and an inner surface of the opening 31B has a shape, for example, to be fitted to the tip portion of the screw 41.

The upper frame 33 is a side-surface casing and is called a "bezel". The upper frame 33 is formed by including an upper plate arranged at a position facing an upper surface of the middle frame 32 and the end edges of the display panel 10 and a wall plate facing a side surface of the middle frame 32 as well as provided to stand on end edges of the upper plate. The wall plate of the upper frame 33 is arranged on the opposite side of the lower frame 31 from the relation with the middle frame 32, which is arranged with a clearance (gap) with respect to at least the side surface (an outer peripheral surface) of the middle frame 32. That is, the wall plate of the upper frame 33 does not touch at least the side surface (outer peripheral surface) of the middle frame 32 directly as well as indirectly. The upper plate of the upper frame 33 has an opening 33A at a position facing the video display surface 10A. The wall plate of the upper frame 33 has one or plural openings 33B piercing in the direction parallel to the video display surface 10A (direction D1). The opening 33B is provided at a position facing the opening 32E of the middle frame 32 and has a smaller diameter than the diameter of the opening 32E. The diameter of the opening 33B is slightly larger than the diameter of the tip portion of the later-described screw 41, as well as slightly small to such as degree that a head portion of the screw 41 does not pass through the opening 33B.

(Fixing Portion 40)

The fixing portion 40 fixes the lower frame 31 to the upper frame 33 by a clamping force working in the direction (direction D1) parallel to the video display surface 10A. The fixing portion 40 further prevents the middle frame 32 from being fallen off in a state where a force is not applied to the middle frame 32 in the direction (direction D1) parallel to the video display surface 10A. The fixing portion 40 has a screw portion 41 and a spacer 42. The spacer 42 corresponds to a specific example of an "interference portion" of the technology according to the present disclosure.

The screw portion 41 has a head portion in which a groove to which a tip of a driver is fitted and a fitting portion connected to the head portion. The fitting portion of the screw portion 41 can fit into the opening 31B of the lower frame 31, having a shape, for example, similar to a tip of a male screw. In this case, the opening 31B of the lower frame 31 has a shape corresponding to the shape of the fitting portion of the screw portion 41, having a shape, for example, similar to a female screw. The fitting portion of the screw portion 41 has a smaller diameter than the head portion of the screw portion 41, which can be inserted into the opening 33B of the upper frame 33. Conversely, the head portion of the screw portion 41 has a larger diameter than the fitting portion of the screw portion 41, which is difficult to pass through the opening 33B of the upper frame 33.

The spacer 42 is arranged inside the opening 32E of the middle frame 32. The spacer 42 is arranged, for example, with a given clearance with respect to the opening 32E of the middle frame 32. The entire outer peripheral surface of the spacer 42 may touch the entire inner peripheral surface of the opening 32E of the middle frame 32, though not shown. When the entire outer peripheral surface of the spacer 42 touches the entire inner peripheral surface of the opening 32E of the middle frame 32, it is possible to reduce the backlash of the middle frame 32. The spacer 42 does not add a force to the middle frame 32 in the direction (direction D1) parallel to the video display surface 10A regardless of whether the spacer 42 touches the middle frame 32 or not. When the entire outer peripheral surface of the spacer 42 touches the entire inner peripheral surface of the opening 32E of the middle frame 32, it is preferable that the outer peripheral surface of the spacer 42 is parallel to the inner peripheral surface of the opening 32E of the middle frame 32. It is further preferable that normal lines of the outer peripheral surface of the spacer 42 and the inner peripheral surface of the opening 32E of the middle frame 32 are orthogonal to the above direction D1 respectively.

The spacer 42 has an opening 42A at a position facing the opening 31B of the lower frame 31 and the opening 33B of the upper frame 33. The spacer 42 has, for example, a cylindrical shape. The opening 42A of the spacer 42 has a larger diameter than the diameter of the opening 31B of the lower frame 31. The spacer 42 may be arranged with a given clearance with respect to a side surface of the fitting portion of the screw portion 41 or may touch the side surface of the fitting portion of the screw portion 41 in the opening 42A, though not shown. The spacer 42 is sandwiched between the lower frame 31 and the upper frame 33 from the direction (direction D1) parallel to the video display surface 10A when the screw portion 41 is fitted into the opening 31B of the lower frame 31. That is, the lower frame 31 and the upper frame 33 are fixed to each other through the spacer 42 by the screw portion 41. In this state, the spacer 42 fixed to the lower frame 31 and the upper frame 33 by the screw portion 41 is sandwiched inside the opening 32E of the middle frame 32, therefore, the falling-off of the middle frame 32 is prevented in the state where the force is not applied to the middle frame 32 in the direction (direction D1) parallel to the video display surface 10A.

(Fixing Layer 50)

The fixing layer 50 fixes the display panel 10 to the supporting surface 32C of the middle frame 32. The fixing layer 50 is made of a material having both adhesiveness or viscosity and elasticity. As a material having both adhesiveness and elasticity, for example, a spongy double-stick tape can be cited. The fixing layer 50 touches the frame area of the display panel 10. When the display panel 10 has the square shape having four edges shown in FIG. 1, for example, the fixing layer 50 has a square shape with four edges as well as the ring shape having an opening so as to correspond to the video display surface 10A. The fixing layer 50 may be provided separately with respect to respective edges of the frame area of the display panel 10. When the fixing layer 50 is provided separately with respect to respective edges of the frame area of the display panel 10, each of the fixing layers 50 provided at respective edges has, for example, a strip shape. The fixing layer 50 may be provided only part of edges of the frame area of the display panel 10.

(Advantages)

Next, advantages of the display device 1 will be explained. In the display device 1, the lower frame 31 protecting the lower surface (further the backlight 20) of the display panel 10 and the upper frame 33 protecting the end edges of the display panel 10 are fixed to each other by the clamping force working in the direction D1 by the screw portion 41. Furthermore, the spacer 42 prevents the falling-off of the middle frame 32 in the state where the force in the direction D1 is not applied to the middle frame 32 supporting the display panel 10. Accordingly, distortion caused by the clamping by the screw portion 41 can hardly propagate to the middle frame 32. Additionally, the middle frame 32 is made by die casting in the display device 1. Accordingly, as the middle frame 32 has characteristics of high stiffness and low distortion, distortion can hardly occur in the middle frame 32, and further, distortion of other members can hardly propagate to the display panel 10 through the middle frame 32. As a result, luminance unevenness caused by the stress added to the display panel 10 can be reduced.

2. MODIFICATION EXAMPLES

Modification Example 1

Figure 4:
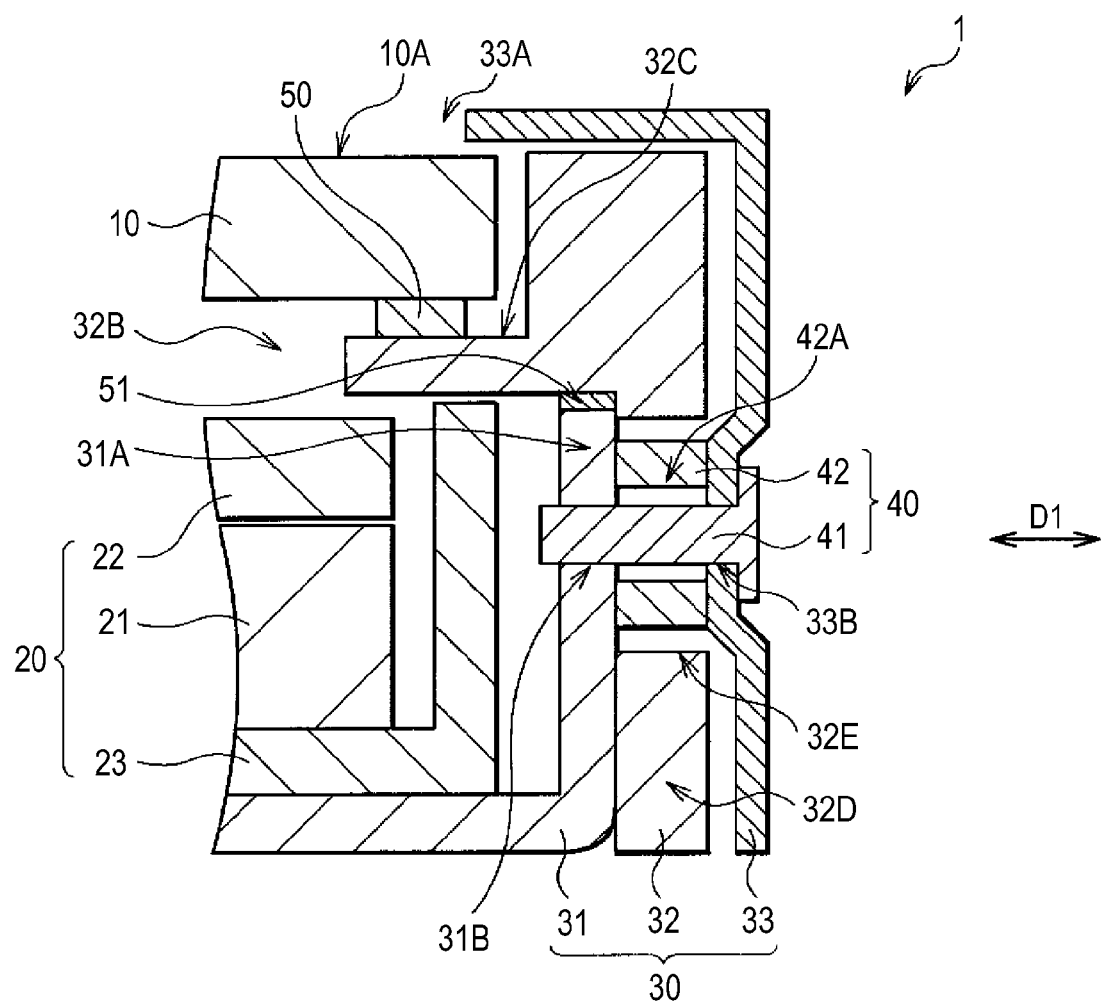
FIG. 4 is a cross-sectional view of a first modification example of the display device of FIG. 3.

The upper surface of the upper end portion 31A of the lower frame 31 directly touch the middle frame 32 in the above embodiment, however, an elastic body 51, for example, may be provided between the upper surface of the upper end portion 31A of the lower frame 31 and the middle frame 32 as shown in FIG. 4. The elastic body 51 is made of, for example, a rubber material such as silicone. In this case, the lower frame 31 may be made by die casting or may be formed by a sheet-metal processing member or a resin molding member. As the elastic body 51 is provided between the upper surface of the upper end portion 31A of the lower frame 31 and the middle frame 32, even when the flatness of the upper surface of the upper end portion 31A of the lower frame 31 is not so high, distortion thereby occurring in the display panel 10 can be reduced.

Modification Example 2

Figure 5:
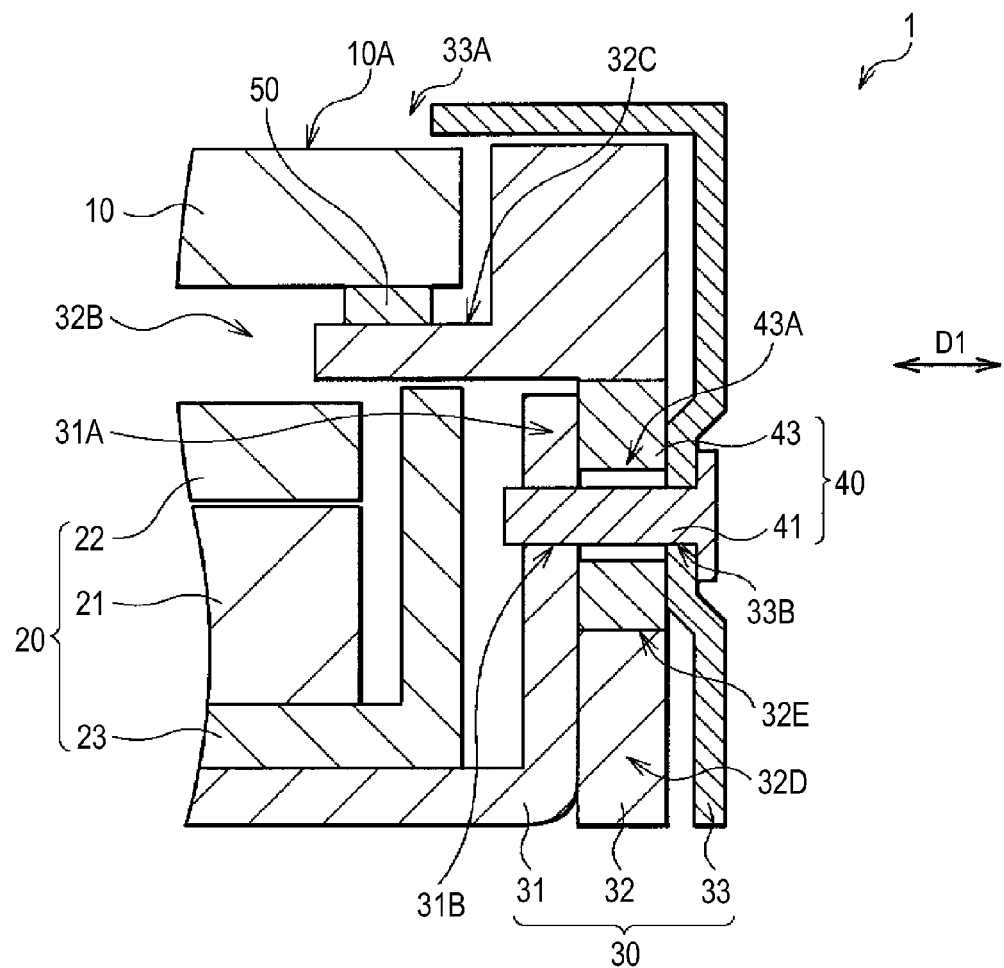
FIG. 5 is a cross-sectional view of a second modification example of the display device of FIG. 3.
Figure 6:
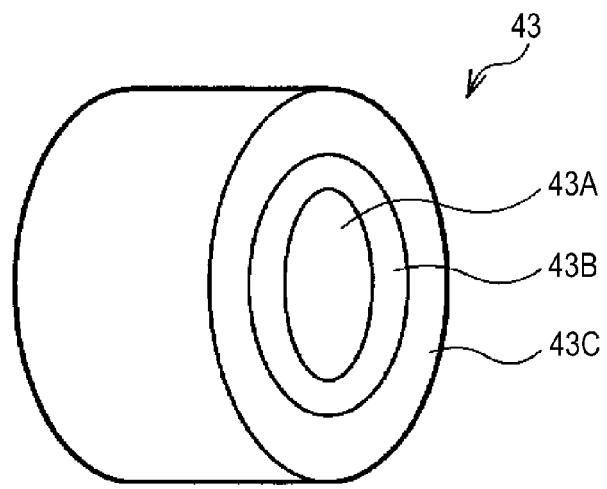
FIG. 6 is a perspective view of a spacer of FIG. 5.

The upper surface of the upper end portion 31A of the lower frame 31 touches the middle frame 32 directly or indirectly in the above embodiment and the modification example thereof, however, it is also preferable that the upper surface does not touch the middle frame 32. As the upper surface of the upper end portion 31A of the lower frame 31 is arranged with a given clearance with respect to the middle frame 32 in this case, the spacer 42 may support the middle frame 32. Incidentally, in the case where the spacer 42 supports the middle frame 32, for example, a spacer 43 having an elastic member at an outer peripheral surface may be provided instead of the spacer 42 as shown in FIG. 5 and FIG. 6. The spacer 43 includes, for example, a ring-shaped metal layer 43B having an opening 43A and a ring-shaped elastic layer 43C which is in contact with an outer peripheral surface of the metal layer 43B. The elastic layer 43C is made of a rubber material such as silicone. The opening 43A corresponds to the opening 42A in the above embodiment.

Modification Example 3

Figure 7:
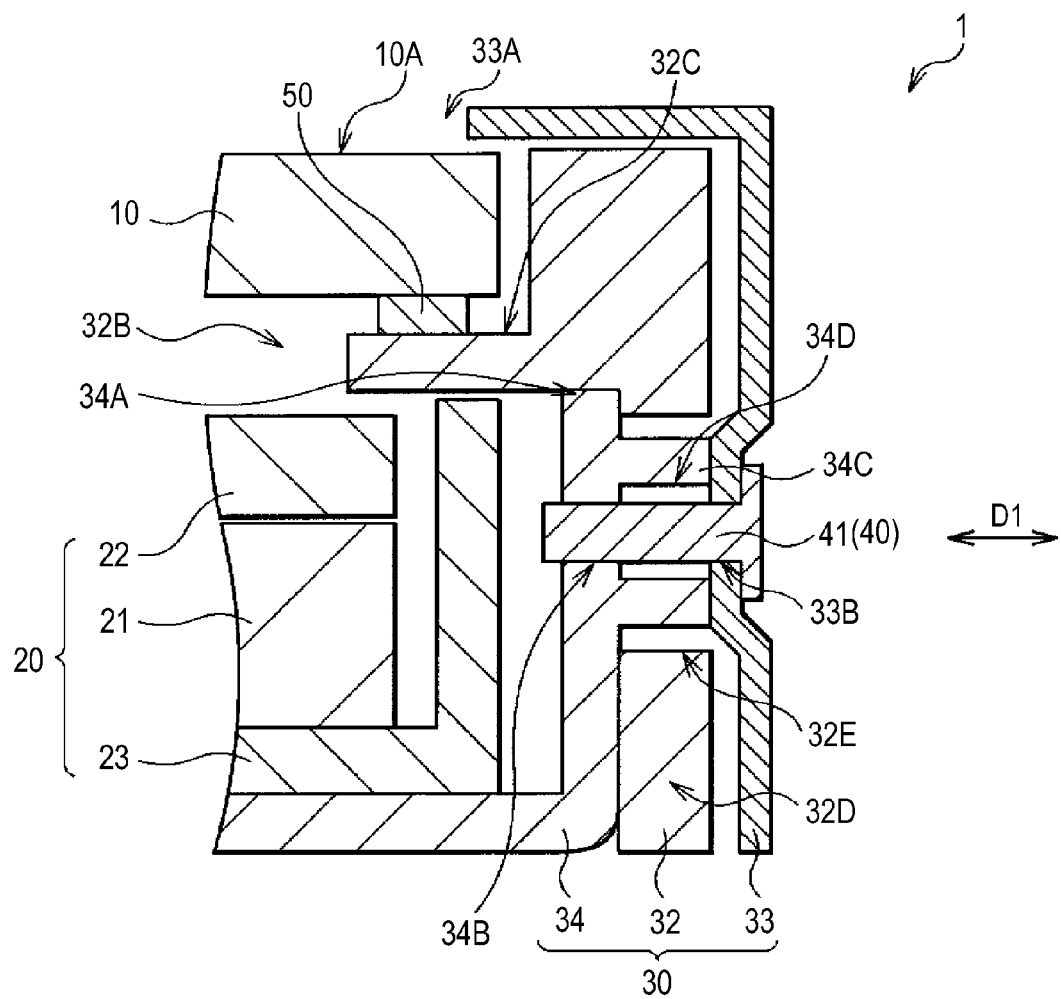
FIG. 7 is a cross-sectional view of a third modification example of the display device of FIG. 3.

The lower frame 31 and the spacer 42 are separately formed in the above embodiment and the modification examples thereof, however, it is also preferable that they are integrally formed. In this case, a structure including the lower frame 31 and the spacer 42 are represented by, for example, a lower frame 34 as shown in FIG. 7. The lower frame 34 is provided instead of the lower frame 31 and the spacer 42, including a convex portion 34C at a portion corresponding to the spacer 42. Wall portions of the convex portion 34C and the upper frame 33 face each other in the direction (direction D1) parallel to the video display surface 10A. The lower frame 34 is preferably made by die casting as the lower frame 34 has a complicated structure in which the convex portion 34C is provided on a side surface thereof. The convex portion 34C corresponds to an "interference portion" of the technology according to the present disclosure.

The convex portion 34C is arranged inside the opening 32E of the middle frame 32. The convex portion 34C is arranged with a given clearance with respect to the opening 32E of the middle frame 32. The entire outer peripheral surface of the convex portion 34C may touch the entire inner peripheral surface of the opening 32E of the middle frame 32, though not shown. When the entire outer peripheral surface of the convex portion 34C touches the entire inner peripheral surface of the opening 32E of the middle frame 32, it is possible to reduce the backlash of the middle frame 32. The convex portion 34C does not add a force to the middle frame 32 in the direction (direction D1) parallel to the video display surface 10A regardless of whether the convex portion 34C touches the middle frame 32 or not. When the entire outer peripheral surface of the convex portion 34C touches the entire inner peripheral surface of the opening 32E of the middle frame 32, it is preferable that the outer peripheral surface of the convex portion 34C is parallel to the inner peripheral surface of the opening 32E of the middle frame 32. It is further preferable that normal lines of the outer peripheral surface of convex portion 34C and the inner peripheral surface of the opening 32E of the middle frame 32 are orthogonal to the above direction D1 respectively.

In a wall plate of the lower frame 34, an upper surface of an end portion (an upper end portion 34A) close to the display panel 10 directly touches the middle frame 32. That is, the lower frame 34 supports the middle frame 32 at the upper end portion 34A. The lower frame 34 has an opening 34B so as to correspond to the opening 31B of the lower frame 31. The convex portion 34C has a hole 34D at a position facing the opening 34B of the lower frame 34 and the opening 33B of the upper frame 33. The convex portion 34C has, for example, a cylindrical shape. The hole 34D of the convex portion 34C has a larger diameter than the diameter of the opening 34B of the lower frame 34. The convex portion 34C may be arranged with a given clearance with respect to the side surface of the fitting portion of the screw portion 41 or may touch the side surface of the fitting portion of the screw portion 41 in the hole 34D, though not shown. The convex portion 34C directly touches the upper frame 33 (specifically, an inner surface of a wall portion of the upper frame 33) when the screw portion 41 is fitted into the opening 34B of the lower frame 34. In this state, the convex portion 34C is sandwiched inside the opening 32E of the middle frame 32, therefore, the falling-off of the middle frame 32 is prevented in the state where the force is not applied to the middle frame 32 in the direction (direction D1) parallel to the video display surface 10A.

Also in the present modification example, the lower frame 34 protecting the lower surface (also the backlight 20) of the display panel 10 and the upper frame 33 protecting the end edges of the display panel 10 are fixed to each other by the clamping force working in the direction D1 by the screw portion 41. Moreover, the convex portion 34C prevents the falling-off of the middle frame 32 in the state where the force in the direction D1 is not applied to the middle frame 32 supporting the display panel 10. Accordingly, distortion caused by the clamping by the screw portion 41 can hardly propagate to the middle frame 32. Additionally, the middle frame 32 is made by die casting also in the present modification example. Accordingly, as the middle frame 32 has characteristics of high stiffness and low distortion, distortion can hardly occur in the middle frame 32, and further, distortion of other members can hardly propagate to the display panel 10 through the middle frame 32. As a result, luminance unevenness caused by the stress added to the display panel 10 can be reduced.

Modification Example 4

Figure 8:
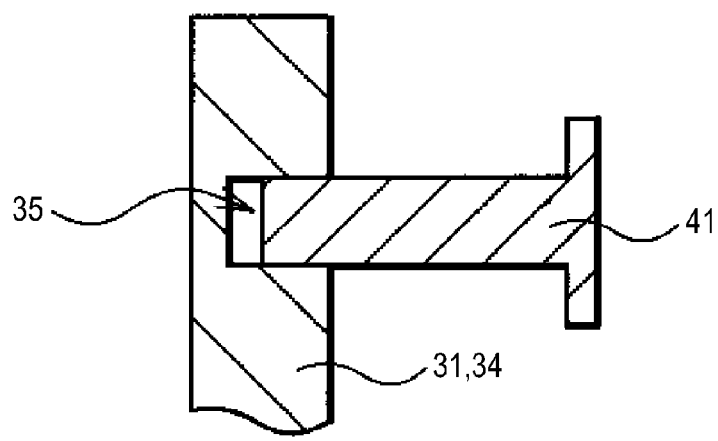
FIG. 8 is a cross-sectional view of a modification example of the display devices of FIGS. 3, 4, 5 and 7.

The lower frames 31 and 34 have the openings 31B and 34B into which the screw portion 41 fits in the above embodiment and the modification examples thereof, however, it is also preferable to provide a hole 35 into which the screw portion 41 fits as shown in FIG. 8, instead of the openings 31B and 34B. The hole 35 does not pierce through the lower frames 31 and 34 and has a bottom.

Modification Example 5

The screw 41 is provided in the fixing portion 40 in the above embodiment and the modification examples thereof, however, other members other than the screw 41 may be provided as long as the member can reduce the transmission of stress to the display panel 10.

Modification Example 6

In the above embodiment and the modification examples thereof, only the two fixing portions 40 are provided, however, three or more, as well as just one fixing portion 40 may be provided. Also in the above embodiment and the modification examples thereof, the screw 41 is configured to be attached to and detached from the lower frame 31, however, it is also possible that the screw 41 is configured not to be attached to and detached from the lower frame 31 when the screw 41 is fixed once.

Modification Example 7

The cases where the display panel 10 is the liquid crystal display panel has been cited as examples in the above embodiment and the modification examples thereof, however, the display panel 10 may be display panels different from the above cases.

3. APPLICATION EXAMPLES

Application Example 1

Figure 9:
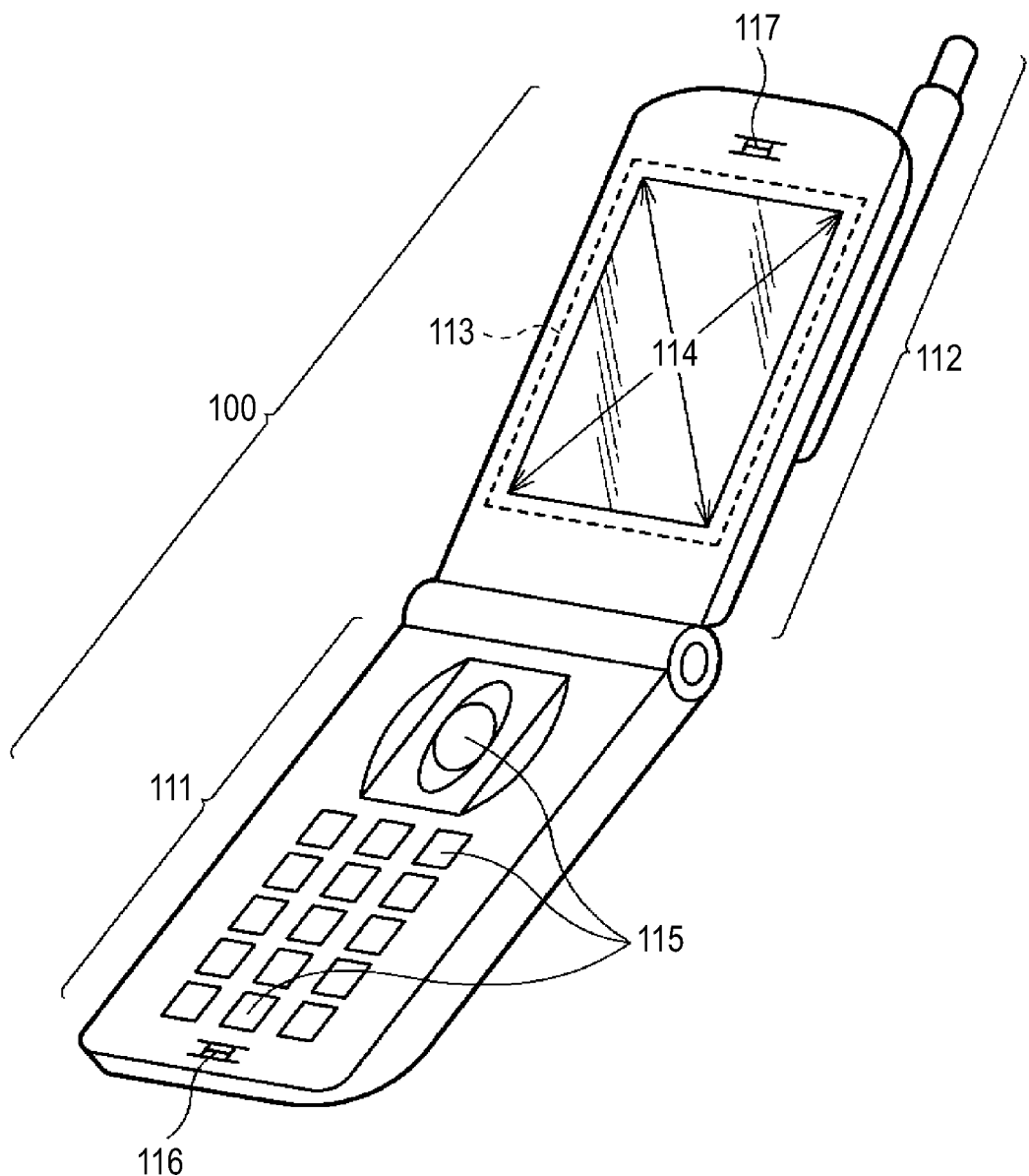
FIG. 9 is a perspective view of an electronic apparatus according to an application example.

Next, an application example of the display device 1 according to the above embodiment and the modification examples thereof will be explained. FIG. 9 is a perspective view showing an example of an outline structure of an electronic apparatus 100 according to the application example. The electronic apparatus 100 is a cellular phone device and includes, for example, a main body unit 111 and a display body unit 112 provided so as to be opened or closed with respect to the main body unit 111 as shown in FIG. 9. The main body unit 111 has operation buttons 115 and a telephone transmitter unit 116. The display body unit 112 includes a display device 113 and a telephone receiver unit 117. The display device 113 displays various types of displays concerning telephone communication on a display screen 114 of the display device 113. The electronic apparatus 100 includes a control unit (not shown) for controlling operations of the display device 113. The control unit is provided as part of a control unit controlling the entire control of the electronic apparatus 100 or provided inside the main body unit 111 or the display body unit 112 independent of the control unit.

The display device 113 has the same structure as the display device 1 according to the above embodiment and the modification examples thereof. Accordingly, luminance unevenness in the display device 113 can be reduced.

Application Example 2

Subsequently, another application example of the display device 1 according to the above embodiment and the modification examples thereof will be explained. FIG. 10 is a front view showing an example of an outline structure of an instrument panel 200 according to the present application example.

The instrument panel 200 is disposed in front of a driver's seat in a car, which has a display device 210. The display device 210 displays various types of information necessary for the drive of the car on a display screen 210A of the display device 210. The display device 210 displays, for example, a speed 211 of the car, the number of engine revolutions 212, a right turn 213, a left turn 214 and various types of information 215 such as the fuel level, the temperature of engine cooling water and so on as shown in FIG. 10.

The display device 210 has the same structure as the display device 1 according to the embodiment and the modification examples thereof. Accordingly, luminance unevenness in the display device 210 can be reduced.

As electronic apparatuses to which the display device 1 according to the embodiment and the modification examples thereof can be applied, it is possible to cite, in addition to the above explained cellular phone device and so on, a personal computer, a liquid crystal television, a viewfinder or a monitor-direct view video tape recorder, a car navigation device, a pager, an electronic notebook, an electric calculator, a word processor, a work station, a television telephone set, a POS terminal unit and so on.

The present disclosure may be implemented, for example, as the following configurations.

(1) An electro-optical device including
an electro-optical panel, and
a casing supporting and protecting the electro-optical panel,
in which the casing has
a first frame body made by die casting supporting the electro-optical panel through a fixing layer,
a second frame body protecting a lower surface of the electro-optical panel,
a third frame body protecting end edges of the electro-optical panel, and
a fixing portion fixing the second frame body and the third frame body to each other by a clamping force working in a first direction, and
the fixing portion or the second frame body has an interference portion preventing falling-off of the first frame body in a state where a force is not applied to the first frame body in the first direction.

(2) The electro-optical device described in the above (1),
in which the first frame body has a first opening piercing in the first direction, and
the interference portion is arranged inside the first opening.

(3) The electro-optical device described in the above (1) or (2),
in which the interference portion is provided in the fixing portion, and
the interference portion is sandwiched between the second frame body and the third frame body from the first direction.

(4) The electro-optical device described in any of the above (1) to (3),
in which the first frame body is formed by including an aluminum alloy or a magnesium alloy.

(5) The electro-optical device described in any of the above (1) to (3),
in which the second frame body touches the lower surface of the electro-optical panel directly or through an elastic body.

(6) The electro-optical device described in any of the above (1) to (5),
in which the second frame body is made by die casting.

(7) The electro-optical device described in the above (2),
in which the interference portion is provided in the second frame body, the interference portion and the third frame body face each other in the first direction, and the interference portion directly touches the third frame body.

(8) The electro-optical device described in the above (7), in which the second frame body is made by die casting.

(9) The electro-optical device described in any of the above (1) to (8), in which the electro-optical panel is a display panel displaying a video by modulating an incident light, the electro-optical device includes a backlight irradiating light on the back of the electro-optical panel, and the second frame body supports and protects the backlight.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electro-optical device comprising:
an electro-optical panel; and
a casing supporting and protecting the electro-optical panel,
wherein the casing has
a first frame body made by die casting supporting the electro-optical panel through a fixing layer,
a second frame body protecting a lower surface of the electro-optical panel,
a third frame body protecting end edges of the electro-optical panel, and
a fixing portion fixing the second frame body and the third frame body to each other by a clamping force working in a first direction, and
the fixing portion or the second frame body has an interference portion preventing falling-off of the first frame body in a state where a force is not applied to the first frame body in the first direction,
the first frame body has a first opening throughout a side wall of the first frame body in the first direction,
the interference portion is arranged inside the first opening,
the interference portion is sandwiched between the second frame body and the third frame body from the first direction,
the side wall of the first frame body having the first opening is disposed between a side wall of the second frame body and a side wall of the third frame body,
side walls of the second frame body touch inner surfaces of side walls of the first frame body, and
side walls of the third frame body are spaced from outer surfaces of the side walls of the first frame body.

2. The electro-optical device according to claim 1, wherein the interference portion is provided in the fixing portion.

3. The electro-optical device according to claim 1, wherein the first frame body is formed by including an aluminum alloy or a magnesium alloy.

4. The electro-optical device according to claim 1, wherein the second frame body touches a lower surface of the first frame body directly or through an elastic body.

5. The electro-optical device according to claim 4, wherein the second frame body is made by die casting.

6. The electro-optical device according to claim 1, wherein the interference portion is provided in the second frame body,
the interference portion and the third frame body face each other in the first direction, and
the interference portion directly touches the third frame body.

7. The electro-optical device according to claim 6, wherein the second frame body is made by die casting.

8. The electro-optical device according to claim 1, wherein the electro-optical panel is a display panel displaying a video by modulating an incident light,
the electro-optical device includes a backlight irradiating light on the back of the electro-optical panel, and
the second frame body supports and protects the backlight.

* * * * *